United States Patent
Chakkera et al.

(10) Patent No.: US 10,443,541 B2
(45) Date of Patent: Oct. 15, 2019

(54) AIRCRAFT THRUST REVERSER SYSTEM WITH ALTERNATE REVERSE THRUST LOAD PATH

(71) Applicant: HONEYWELL INTERNATIONAL INC., Morris Plains, NJ (US)

(72) Inventors: Kevin K Chakkera, Chandler, AZ (US); Daniel C Birchak, Gilbert, AZ (US); Donald Jeffrey Christensen, Phoenix, AZ (US); James Wawrzynek, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 395 days.

(21) Appl. No.: 15/385,069

(22) Filed: Dec. 20, 2016

(65) Prior Publication Data

US 2018/0209376 A1    Jul. 26, 2018

Related U.S. Application Data

(60) Provisional application No. 62/378,960, filed on Aug. 24, 2016.

(51) Int. Cl.
  *F02K 1/72* (2006.01)
  *F02K 1/76* (2006.01)
  *F02K 1/62* (2006.01)

(52) U.S. Cl.
  CPC .............. *F02K 1/763* (2013.01); *F02K 1/625* (2013.01); *F02K 1/72* (2013.01); *F05D 2250/34* (2013.01);
  (Continued)

(58) Field of Classification Search
  CPC .......... F02K 1/763; F02K 1/766; F02K 1/625; F02K 1/72
  See application file for complete search history.

(56) References Cited

U.S. PATENT DOCUMENTS 6,786,039 B2 *  9/2004  Chakkera ................ F02K 1/766
                                                        239/265.29
6,974,107 B2   12/2005  Christensen et al.
(Continued)

FOREIGN PATENT DOCUMENTS

| EP | 0087255 A2 | 2/1983 |
| WO | 2004/022963 A1 | 3/2004 |
| WO | 2015/059234 A1 | 4/2015 |

OTHER PUBLICATIONS

Extended EP Search Report for Application No. 17187154.4—1007 dated Jan. 18, 2018.

*Primary Examiner* — Andrew H Nguyen
(74) *Attorney, Agent, or Firm* — Lorenz & Kopf, LLP

(57) ABSTRACT

A thrust reverser system for a gas turbine engine includes a support structure, a transcowl, and an actuator. The transcowl is mounted on the support structure and is axially translatable between a stowed position and a deployed position. The actuator is coupled to the transcowl and the support structure, and is configured to supply an actuation force to the transcowl to thereby move the transcowl between the stowed and deployed positions. The actuator includes an actuator housing, a screw, a nut, a rod end, and a tension rod. The tension rod is engaged by the nut when the transcowl is in the deployed position and is engaged by the rod end when the transcowl is in the stowed position, whereby actuator loads, in both the deployed and stowed positions, are transmitted through the tension rod to the support structure.

17 Claims, 5 Drawing Sheets

(52) U.S. Cl.
CPC ......... *F05D 2260/50* (2013.01); *Y02T 50/671* (2013.01)

(56) References Cited

U.S. PATENT DOCUMENTS 8,033,500 B1     10/2011   Charafeddine et al.
9,458,795 B2 *   10/2016   Werquin ............. F16H 25/2454

\* cited by examiner

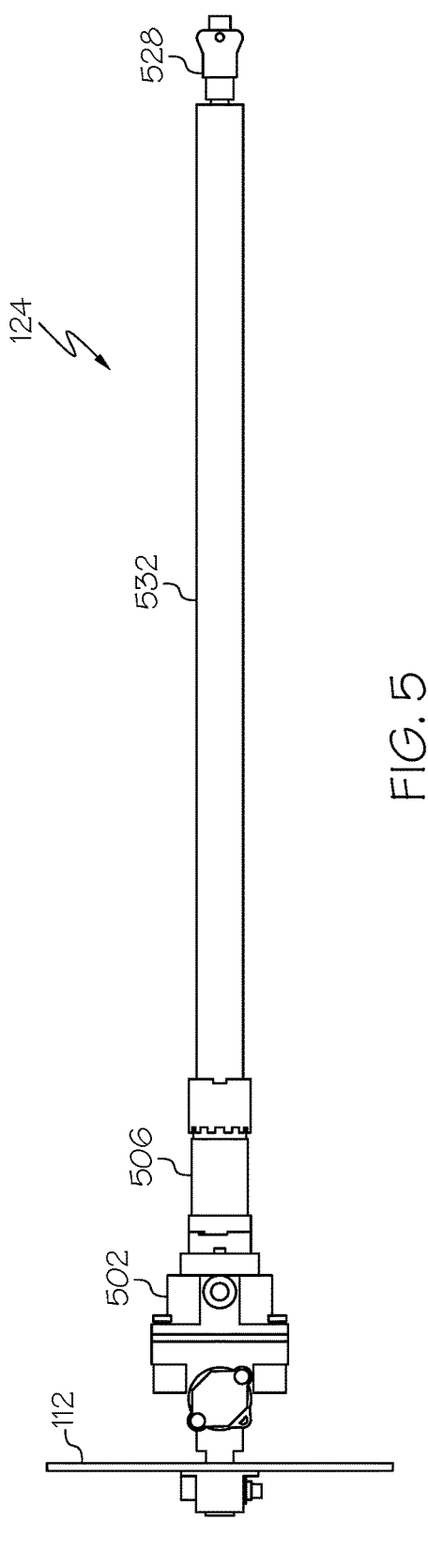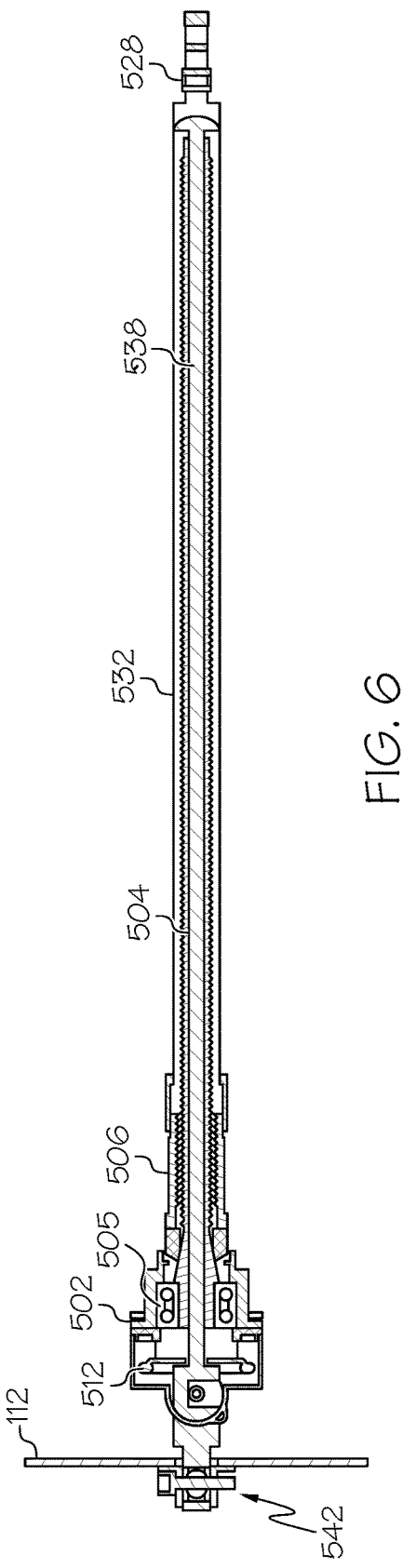

AIRCRAFT THRUST REVERSER SYSTEM WITH ALTERNATE REVERSE THRUST LOAD PATH

CROSS-REFERENCE TO RELATED APPLICATION

This application claims the benefit of U.S. Provisional Application No. 62/378,960, filed Aug. 24, 2016.

TECHNICAL FIELD

The present invention generally relates to aircraft thrust reversers, and more particularly relates to an aircraft thrust reverser with an alternate reverse thrust load path.

BACKGROUND

When turbine-powered aircraft land, the wheel brakes and the imposed aerodynamic drag loads (e.g., flaps, spoilers, etc.) of the aircraft may not be sufficient to achieve the desired stopping distance. Thus, the engines on most turbine-powered aircraft include thrust reversers. Thrust reversers enhance the stopping power of the aircraft by redirecting the engine exhaust airflow in order to generate reverse thrust. When stowed, the thrust reverser typically forms a portion the engine nacelle and forward thrust nozzle. When deployed, the thrust reverser typically redirects at least a portion of the airflow (from the fan and/or engine exhaust) forward and radially outward, to help decelerate the aircraft.

Various thrust reverser designs are commonly known, and the particular design utilized depends, at least in part, on the engine manufacturer, the engine configuration, and the propulsion technology being used. Thrust reverser designs used most prominently with turbofan engines fall into two general categories: (1) fan flow thrust reversers, and (2) mixed flow thrust reversers. Fan flow thrust reversers affect only the bypass airflow discharged from the engine fan. Whereas, mixed flow thrust reversers affect both the fan airflow and the airflow discharged from the engine core (core airflow).

Fan flow thrust reversers are typically used on relatively high-bypass ratio turbofan engines. Fan flow thrust reversers include so-called "Cascade-type" or "Translating Cowl-type" thrust reversers. Fan flow thrust reversers are generally positioned circumferentially around the engine core aft of the engine fan and, when deployed, redirect fan bypass airflow through a plurality of cascade vanes disposed within an aperture of a reverse flow path. Typically, fan flow thrust reverser designs include one or more translating sleeves or cowls ("transcowls") that, when deployed, open an aperture, expose cascade vanes, and create a reverse flow path. Fan flow reversers may also include so-called pivot doors or blocker doors which, when deployed, rotate to block the forward thrust flow path.

In contrast, mixed flow thrust reversers are typically used with relatively low-bypass ratio turbofan engines. Mixed flow thrust reversers typically include so-called "Target-type," "Bucket-type," and "Clamshell Door-type" thrust reversers. These types of thrust reversers typically use two or more pivoting doors that rotate, simultaneously opening a reverse flow path through an aperture and blocking the forward thrust flow path. However, a transcowl type thrust reverser could also be configured for use in a mixed flow application. Regardless of type, mixed flow thrust reversers are necessarily located aft or downstream of the engine fan and core, and often form the aft part of the engine nacelle.

Regardless of the specific design, the end of stroke reverse thrust loads in most thrust reverser systems can be significantly higher due to the changed air stream kinematics. This can significantly impact the actuation system sizing and weight especially in the limiting case of rejected take-off (RTO) loads. It would be desirable to have an actuator configuration that reduces the size and power requirements of known thrust reverser systems, especially when the in-transit loads are much lower compared to the end of stroke reverse thrust loads.

Hence, there is a need for an actuator configuration that bypasses the end of stroke loads, both in deploy and stow, directly into support structure rather than grounding the loads out through the actuator into support structure, and thereby significantly reduce the size and weight of the actuator and the associated mounting bracketry.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a thrust reverser system for a gas turbine engine includes a support structure, a transcowl, and an actuator. The support structure is configured to be mounted to the turbine engine. The transcowl is mounted on the support structure and is axially translatable, relative to the support structure, between a stowed position and a deployed position. The actuator is coupled to the transcowl and the support structure, and is configured to supply an actuation force to the transcowl to thereby move the transcowl between the stowed and deployed positions. The actuator includes an actuator housing, a screw, a nut, a rod end, and a tension rod. The screw is rotationally mounted at least partially within the actuator housing, is coupled to receive a drive torque, and is configured, upon receipt of the drive torque, to rotate. The nut has an opening through which the screw extends, and is configured, upon rotation of the screw, to translate between a fully retracted position and a fully extended position, to thereby move the transcowl between the stowed and deployed positions, respectively. The rod end is coupled to, and is spaced apart from, the nut, and is configured to translate with the nut. The tension rod is coupled to the support structure and extends through the actuator housing and the screw. The tension rod is engaged by the nut when the transcowl is in the deployed position and is engaged by the rod end when the transcowl is in the stowed position, whereby actuator loads, in both the deployed and stowed positions, are transmitted through the tension rod to the support structure.

In another embodiment, a thrust reverser system for a gas turbine engine includes a support structure, a transcowl, and an actuator. The support structure is configured to be mounted to the turbine engine. The transcowl is mounted on the support structure and is axially translatable, relative to the support structure, between a stowed position and a deployed position. The actuator is coupled to the transcowl and the support structure, and is configured to supply an actuation force to the transcowl to thereby move the transcowl between the stowed and deployed positions. The actuator includes an actuator housing, a screw, a nut, a rod end, an extension tube, and a tension rod. The screw is rotationally mounted at least partially within the actuator housing, is coupled to receive a drive torque, and is configured, upon receipt of the drive torque, to rotate. The nut has an opening through which the screw extends, and is configured, upon rotation of the screw, to translate between a fully retracted position and a fully extended position, to thereby move the transcowl between the stowed and deployed positions, respectively. The rod end is coupled to, and is spaced apart from, the nut, and is configured to translate with the nut. The extension tube is coupled between the nut and the rod end. The tension rod is coupled to the support structure and extends through the actuator housing and the screw. The tension rod is engaged by the nut when the transcowl is in the deployed position and is engaged by the rod end when the transcowl is in the stowed position, whereby actuator loads, in both the deployed and stowed positions, are transmitted through the tension rod to the support structure. The length of the tension rod that extends from the support structure and through the actuator housing and screw is adjustable.

In yet another embodiment, a thrust reverser system for a gas turbine engine includes a support structure and an actuator. The support structure is configured to be mounted to the turbine engine, and the actuator is coupled to the support structure. The actuator is adapted to receive a drive torque and is configured, upon receipt thereof, to move between a fully retracted position and a fully extended position. The actuator includes an actuator housing, a screw, a nut, a rod end, and a tension rod. The screw is rotationally mounted at least partially within the actuator housing, is coupled to receive the drive torque, and is configured, upon receipt of the drive torque, to rotate. The nut has an opening through which the screw extends and is configured, upon rotation of the screw, to translate between the fully retracted and fully extended positions. The rod end is coupled to, and is spaced apart from, the nut, and is configured to translate with the nut. The tension rod is coupled to the support structure and extends through the actuator housing and the screw. The tension rod is engaged by the nut when the actuator is in the fully extended position and is engaged by the rod end when the actuator is in the fully retracted position, whereby actuator loads, in both the fully retracted and fully extended positions, are transmitted through the tension rod to the support structure.

Furthermore, other desirable features and characteristics of the thrust reverser system and actuator will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIGS. 5-9 depict various views of one embodiment of an actuator assembly that can be used in the systems of FIGS. 1-4.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
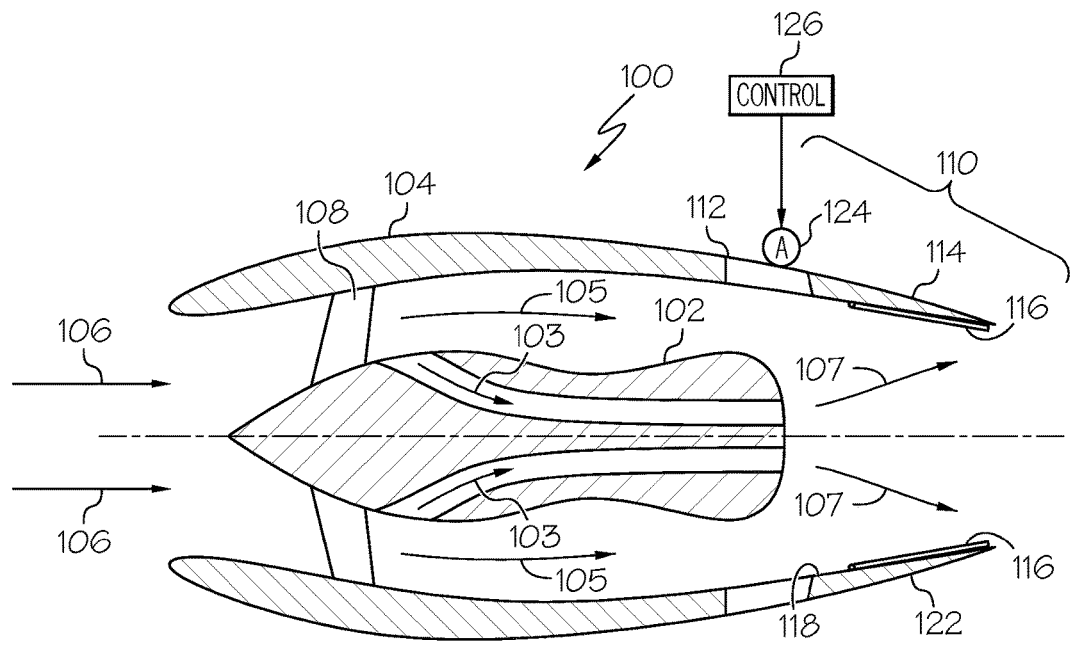
FIGS. 1 and 2 depict a turbofan engine equipped with a mixed flow thrust reverser system, and with the thrust reverser system in a stowed position and deployed position, respectively.
Figure 2:
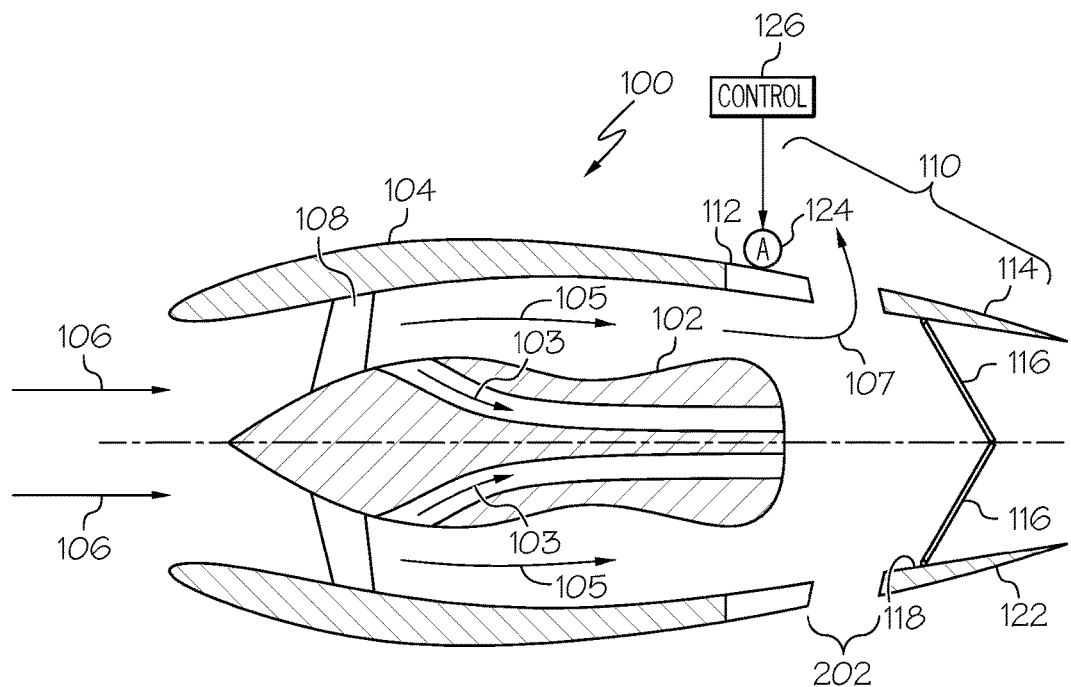
Figure 3:
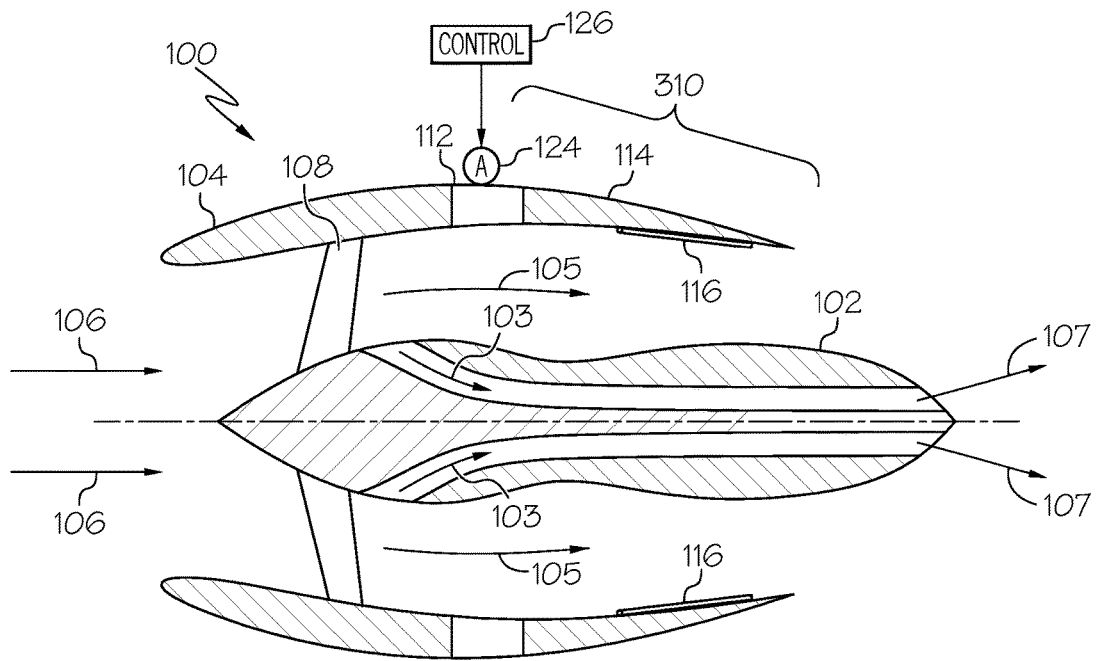
FIGS. 3 and 4 depict a turbofan engine equipped with a fan flow thrust reverser system, and with the thrust reverser system in a stowed position and deployed position, respectively.
Figure 4:
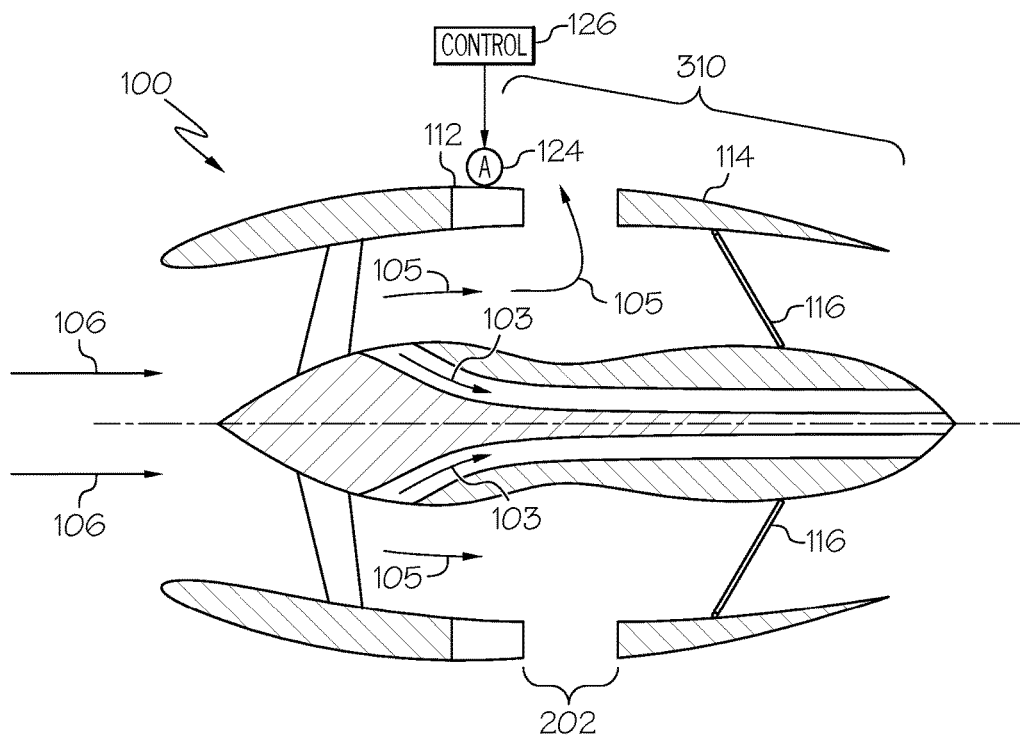

A turbofan engine is a component of an aircraft's propulsion system that typically generates thrust by means of an accelerating mass of gas. Simplified cross section views of a traditional aircraft turbofan engine 100 are depicted in FIGS. 1-4. In particular, FIGS. 1 and 2 depict the engine 100 equipped with a mixed flow thrust reverser system, and with the thrust reverser system in a stowed position and deployed position, respectively, and FIGS. 3 and 4 depict the engine 100 equipped with a fan flow thrust reverser system, and with the thrust reverser system in a stowed position and deployed position, respectively.

Referring first to FIGS. 1 and 2, the turbofan engine 100 includes a gas turbine engine 102 that is encased within an aerodynamically smooth outer covering, generally referred to as the nacelle 104. Ambient air 106 is drawn into the nacelle 104 via a rotationally mounted fan 108 to thereby supply engine airflow. A portion of the engine airflow is drawn into the gas turbine engine 102, where it is pressurized, and mixed with fuel and ignited, to generate hot gasses known as core flow 103. The remainder of engine airflow bypasses the gas turbine engine 102 and is known as fan flow 105. The core flow 103 and the fan flow 105 mix downstream of the gas turbine engine 102 to become the engine exhaust flow 107, which is discharged from the turbofan engine 100 to generate forward thrust.

The nacelle 104 comprises a mixed flow thrust reverser system 110. The thrust reverser system 110 includes a support structure 112, an annular translatable cowl, or transcowl 114, and one or more doors 116 (two in the depicted embodiment). The transcowl 114 is mounted on the support structure 112 and has an inner surface 118 and an outer surface 122. The transcowl 114 is axially translatable, relative to the support structure 112, between a stowed position, which is the position depicted in FIG. 1, and a deployed position, which is the position depicted in FIG. 2. In the stowed position, the transcowl 114 is disposed adjacent the support structure 112. In the deployed position, the transcowl 114 is displaced from the support structure 112 by a second distance to form a reverse thrust aperture 202 (see FIG. 2).

Each of the one or more doors 116 is rotatable between a first position, which is the position depicted in FIG. 1, and a second position, which is the position depicted in FIG. 2. More specifically, each door 116 is rotatable between the first position and the second position, when the transcowl 114 translates between the stowed position and the deployed position, respectively. As is generally known, each door 116 is configured, when it is in the second position, to redirect at least a portion of the engine airflow through the reverse thrust aperture 202 to thereby generate reverse thrust. In particular, at least a portion of the engine exhaust flow 107 (e.g., mixed core flow 103 and fan flow 105) is redirected through the reverse thrust aperture 202.

Referring now to FIGS. 3 and 4, the turbofan engine 100 equipped with a fan flow thrust reverser system 310 will be briefly described. Before doing so, however, it is noted that like reference numerals in FIGS. 1-4 refer to like parts, and that descriptions of the like parts of the depicted turbofan engines 100 will not be repeated. The notable difference between the turbofan engine 100 depicted in FIGS. 3 and 4 is that the fan flow thrust reverser system 310 is disposed further upstream than that of the mixed flow thrust reverser system 110 depicted in FIGS. 1 and 2.

As with the mixed flow thrust reverser system 110, the depicted fan flow thrust reverser system 310 includes the support structure 112, the transcowl 114, and the one or more doors 116 (again, two in the depicted embodiment). Moreover, each door 116 is rotatable between a first position, which is the position depicted in FIG. 3, and a second position, which is the position depicted in FIG. 4. Similarly, each door 116 is rotatable between the first position and the second position, when the transcowl 114 translates between the stowed position and the deployed position, respectively. As is generally known, each door 116 is configured, when it is in the second position, to redirect at least a portion of the engine airflow through the reverse thrust aperture 202 to thereby generate reverse thrust. In this case, however, only fan bypass flow 105 is redirected through the reverse thrust aperture 202.

As FIGS. 1-4 also depict, the thrust reverser systems 110, 310 additionally include a plurality of actuators 124. Each actuator 124 is coupled to the support structure 112 and a transcowl 114, and is configured to supply an actuation force to the transcowl 114. More specifically, each actuator 124 is responsive to commands supplied from a control 126 to supply an actuation force to the transcowl 114, to thereby move the transcowl 114 between the stowed position and the deployed position. It will be appreciated that the main actuators 124 may be implemented using any one of numerous types of actuators. In the depicted embodiment, each is implemented using linear screw-type actuator that includes an alternate reverse thrust load path. One embodiment of an actuator 124 is depicted in FIGS. 5-8, and will now be described.

Referring first to FIGS. 5 and 6, it is seen that the depicted actuator 124 is implemented as a ball screw actuator, but in other embodiments it could be implemented as an acme screw actuator, or any one of numerous other screw-type actuators. Nonetheless, the depicted actuator 124 includes an actuator housing 502, a screw 504, a nut 506.

Figure 7:
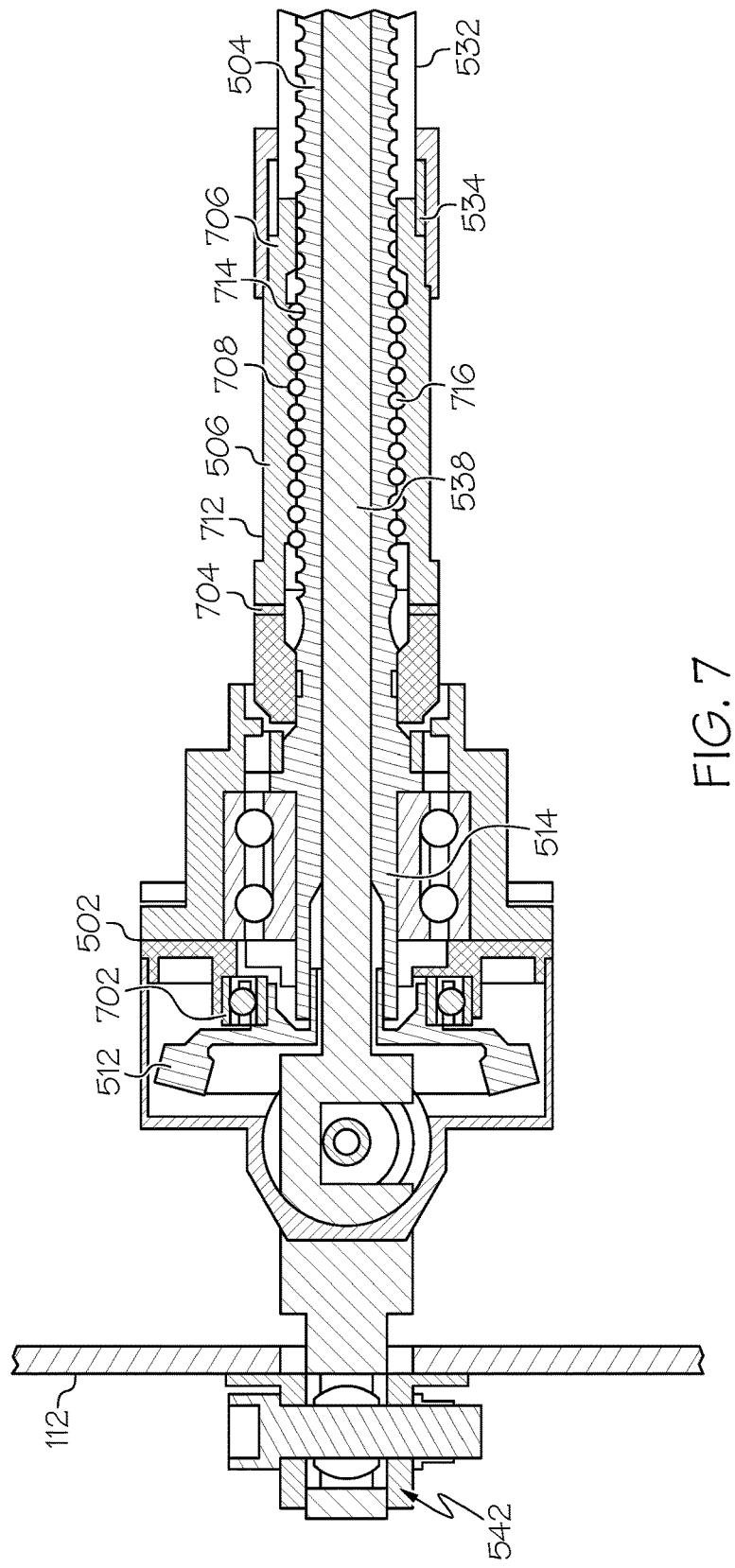
Figure 8:
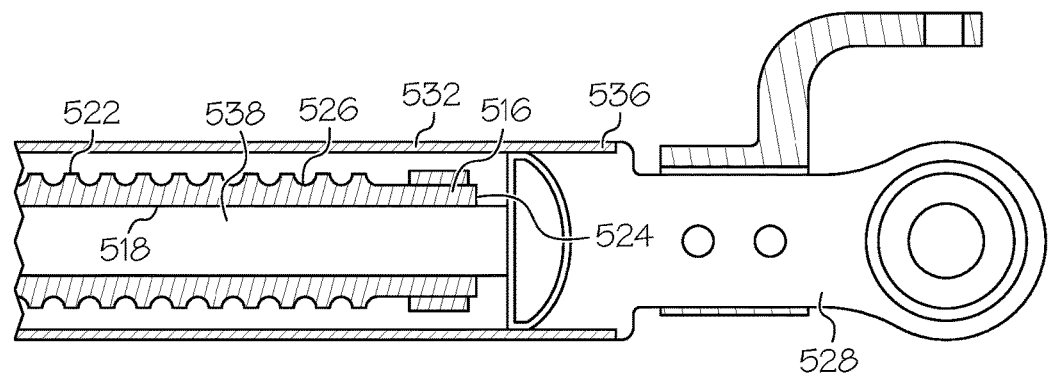

The screw 504 is rotationally mounted at least partially within the actuator housing 502 via, for example, a duplex bearing set 505. The screw 504 is coupled to receive a drive torque from, for example, a non-depicted motor and is configured, upon receipt of the drive torque, to rotate and supply a drive force to the nut 506. More specifically, at least in the depicted embodiment, the screw 504 receives the drive torque via, for example, a gear 512. As shown most clearly in FIG. 7, the gear 512, which may be variously configured and implemented, is rotationally mounted in the housing 502 via a bearing assembly 702. The screw 504 may be variously configured and implemented, but in the depicted embodiment it is configured and implemented as a ball screw, and includes at least a first end 514 (FIG. 7), a second end 516 (FIG. 8), an inner surface 518 (FIG. 8), and an outer surface 522 (FIG. 8). The screw inner surface 518 defines a passageway 524 that extends through the screw 504 between the first and second ends 514, 516. The outer surface 522 has a plurality of helical grooves (or "threads") 526 formed thereon, and is coupled to the gear 512.

The nut 506 is disposed within the actuator housing 502 and has an opening 528 through which the screw 504 extends. The nut 506 is configured, upon receipt of the drive force supplied thereto from the screw 504, to translate between a fully retracted position and a fully extended position, to thereby move the transcowls 114 between the stowed and deployed positions, respectively. As illustrated most clearly in FIG. 7, the nut 506 includes a first end 704, a second end 706, an inner surface 708, and an outer surface 712. The nut inner surface 708 has a single or a plurality of grooves (or "threads") 714 formed thereon. In the depicted embodiment, in which the actuator 124 is a ball screw type linear actuator, a plurality of recirculating balls 716 are disposed within the nut grooves 714, and in selected ones of the helical grooves 526. The balls 716, in combination with the grooves 526, 714, convert the rotational movement of the screw 504 into the translational movement of the nut 506. It will be appreciated that the direction in which the nut 506 travels will depend on the direction in which the screw 504 rotates.

The actuator 100 additionally includes a rod end 528 that is coupled to, and spaced apart from, the nut 506. In the depicted embodiment, the rod end 528 is coupled to the nut 506 via an extension tube 532. In particular, the extension tube 532 has a first end 534 that is coupled to the nut outer surface 715, and a second end 536 that is coupled to the rod end 528. The extension tube 532 and rod end 528 are thus both configured to translate with the nut 506.

The actuator 124 additionally includes a tension rod 538. The tension rod 538 is coupled to the support structure 112 and extends through the actuator housing 502 and the screw 504. The tension rod 538 is engaged by the nut 506 when the actuator 124 is in the deployed position, and is engaged by the rod end 528 when the actuator 124 is in the stowed position. As such, actuator loads, in both the deployed and stowed positions, are transmitted through the tension rod 538 to the support structure 112. In the deployed position, the actuator load path is through the extension tube 532, to the nut 506, to the tension rod 538, and then to the support structure 112. In the stowed position, the actuator load path is from the rod end 528, to the tension rod 538, and then to the support structure 112.

Figure 9:
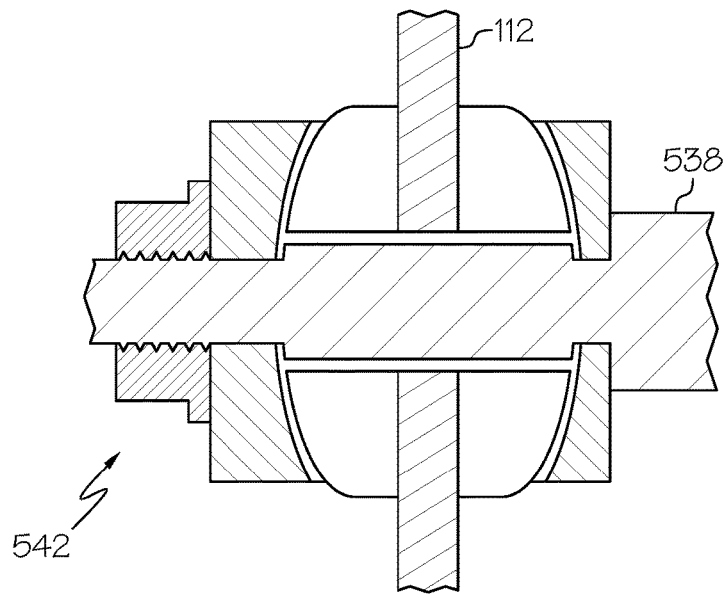

The inclusion and configuration of the tension rod 538 allows various actuator components to be sized for transit loads only. The tension rod 538 can be coupled to the support structure 112 using any one of numerous techniques. For example, a spherical rod end assembly 542, embodiments of which are depicted in FIGS. 7 and 9, allows the tension rod 538 to pivot. As these embodiments also depict, the length of the tension rod 538 is preferably adjustable, and can be accomplished using various techniques. Some example techniques include shimming, and the use of a threaded shaft to a locking/anti-rotation feature.

The actuator configuration depicted and described herein results in a significantly smaller and lighter actuation system as well as the mounting bracketry. The tension rod absorbs any impact energy and eliminates chipping, wear or cracking of the hardened ball deploy and stow stops due to the impact loads. It also allows, in some embodiments, for the elimination of the stow stops, further reducing actuator weight.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It is understood that various changes may be made in the function and arrangement of elements of the exemplary embodiments described herein without departing from the scope of the invention as set forth in the appended claims.

What is claimed is:

1. A thrust reverser system for a gas turbine engine, comprising:
   a support structure configured to be mounted to the turbine engine;
   a transcowl mounted on the support structure and axially translatable, relative to the support structure, between a stowed position and a deployed position; and
   an actuator coupled to the transcowl and the support structure, the actuator configured to supply an actuation force to the transcowl to thereby move the transcowl between the stowed and deployed positions, the actuator comprising:
     an actuator housing;
     a screw rotationally mounted at least partially within the actuator housing, the screw coupled to receive a drive torque and configured, upon receipt of the drive torque, to rotate;
     a nut having an opening through which the screw extends and configured, upon rotation of the screw, to translate between a fully retracted position and a fully extended position, to thereby move the transcowl between the stowed and deployed positions, respectively;
     a rod end coupled to, and spaced apart from, the nut, the rod end configured to translate with the nut; and
     a tension rod coupled to the support structure and extending through the actuator housing and screw, the tension rod engaged by the nut when the transcowl is in the deployed position and engaged by the rod end when the transcowl is in the stowed position, whereby actuator loads, in both the deployed and stowed positions, are transmitted through the tension rod to the support structure.

2. The system of claim 1, wherein:
   the tension rod has a length; and
   the length of the tension rod that extends from the support structure and through the actuator housing and screw is adjustable.

3. The system of claim 1, further comprising a spherical rod end assembly coupled to the support structure and the tension rod.

4. The system of claim 1, wherein the actuator further comprises a gear, the gear rotationally mounted in the actuator housing and coupled to the screw, the gear configured to receive and transfer the drive torque to the screw.

5. The system of claim 1, wherein the actuator further comprises an extension tube, the extension tube coupled between the nut and the rod end.

6. The system of claim 5, wherein:
   the actuator loads are transmitted via an actuator load path;
   in the deployed position, the actuator load path is through the extension tube, to the nut, to the tension rod, and to the support structure; and
   in the stowed position, the actuator load path is from the rod end, to the tension rod, and to the support structure.

7. A thrust reverser system for a gas turbine engine, comprising:
   a support structure configured to be mounted to the turbine engine;
   a transcowl mounted on the support structure and axially translatable, relative to the support structure, between a stowed position and a deployed position; and
   an actuator coupled to the transcowl and the support structure, the actuator configured to supply an actuation force to the transcowl to thereby move the transcowl between the stowed and deployed positions, the actuator comprising:
     an actuator housing;
     a screw rotationally mounted at least partially within the actuator housing, the screw coupled to receive a drive torque and configured, upon receipt of the drive torque, to rotate;
     a nut having an opening through which the screw extends and configured, upon rotation of the screw, to translate between a fully retracted position and a fully extended position, to thereby move the transcowl between the stowed and deployed positions, respectively;
     a rod end coupled to, and spaced apart from, the nut, the rod end configured to translate with the nut;
     an extension tube coupled between the nut and the rod end; and
     a tension rod coupled to the support structure and extending through the actuator housing and the screw, the tension rod having a length and engaged by the nut when the transcowl is in the deployed position and engaged by the rod end when the transcowl is in the stowed position, whereby actuator loads, in both the deployed and stowed positions, are transmitted through the tension rod to the support structure,
     wherein the length of the tension rod that extends from the support structure and through the actuator housing and screw is adjustable.

8. The system of claim 7, further comprising a spherical rod end assembly coupled to the support structure and the tension rod.

9. The system of claim 7, wherein the actuator further comprises a gear, the gear rotationally mounted in the actuator housing and coupled to the screw, the gear configured to receive and transfer the drive torque to the screw.

10. The system of claim 7, wherein the actuator further comprises an extension tube, the extension tube coupled between the nut and the rod end.

11. The system of claim 7, wherein:
the actuator loads are transmitted via an actuator load path;
in the deployed position, the actuator load path is through the extension tube, to the nut, to the tension rod, and to the support structure; and
in the stowed position, the actuator load path is from the rod end, to the tension rod, and to the support structure.

12. A thrust reverser system for a gas turbine engine, comprising:
a support structure configured to be mounted to the turbine engine; and
an actuator coupled to the support structure, the actuator adapted to receive a drive torque and configured, upon receipt thereof, to move between a fully retracted position and a fully extended position, the actuator comprising:
an actuator housing;
a screw rotationally mounted at least partially within the actuator housing, the screw coupled to receive the drive torque and configured, upon receipt of the drive torque, to rotate;
a nut having an opening through which the screw extends and configured, upon rotation of the screw, to translate between the fully retracted and fully extended positions;
a rod end coupled to, and spaced apart from, the nut, the rod end configured to translate with the nut; and
a tension rod coupled to the support structure and extending through the actuator housing and the screw, the tension rod engaged by the nut when the actuator is in the fully extended position and engaged by the rod end when the actuator is in the fully retracted position, whereby actuator loads, in both the fully retracted and fully extended positions, are transmitted through the tension rod to the support structure.

13. The system of claim 12, wherein:
the tension rod has a length; and
the length of the tension rod that extends from the support structure and through the actuator housing and screw is adjustable.

14. The system of claim 12, further comprising a spherical rod end assembly coupled to the support structure and the tension rod.

15. The system of claim 12, wherein the actuator further comprises a gear, the gear rotationally mounted in the actuator housing and coupled to the screw, the gear configured to receive and transfer the drive torque to the screw.

16. The system of claim 12, wherein the actuator further comprises an extension tube, the extension tube coupled between the nut and the rod end.

17. The system of claim 16, wherein:
the actuator loads are transmitted via an actuator load path;
in the fully extended position, the actuator load path is through the extension tube, to the nut, to the tension rod, and to the support structure; and
in the fully retracted position, the actuator load path is from the rod end, to the tension rod, and to the support structure.

* * * * *